(12) United States Patent
Huang et al.

(10) Patent No.: US 11,118,847 B2
(45) Date of Patent: Sep. 14, 2021

(54) FINNED HEAT EXCHANGER TUBE

(71) Applicant: Shanghai Power Equipment Research Institute Co., Ltd., Shanghai (CN)

(72) Inventors: Zhiqiang Huang, Shanghai (CN); Kaiyun Zheng, Shanghai (CN)

(73) Assignee: SHANGHAI POWER EQUIPMENT RESEARCH INSTITUTE CO., LTD., Shanghai (CN)

( * ) Notice: Subject to any disclaimer, the term of this patent is extended or adjusted under 35 U.S.C. 154(b) by 0 days.

(21) Appl. No.: 16/884,085

(22) Filed: May 27, 2020

(65) Prior Publication Data
US 2020/0284528 A1 Sep. 10, 2020

Related U.S. Application Data

(63) Continuation-in-part of application No. PCT/CN2018/122564, filed on Dec. 21, 2018.

(30) Foreign Application Priority Data

Dec. 22, 2017 (CN) .......................... 201711410324.2

(51) Int. Cl.
*F28F 1/26* (2006.01)
(52) U.S. Cl.
CPC ...................................... *F28F 1/26* (2013.01)
(58) Field of Classification Search
CPC ...... F28F 1/10; F28F 1/105; F28F 1/12; F28F 1/128; F28F 1/24; F28F 1/26; F28F 1/30; F28F 1/42; F28F 2215/00; F28F 2215/06; F28F 2215/08; F28D 1/0233; F28D 1/053; F28D 7/10
See application file for complete search history.

(56) References Cited

U.S. PATENT DOCUMENTS

| | | | | |
|---|---|---|---|---|
| 1,699,542 A | * | 1/1929 | Murray | F28D 1/053 165/131 |
| 1,726,235 A | * | 8/1929 | Murray | F28D 1/053 165/131 |
| 1,942,211 A | * | 1/1934 | Hartwig | F28D 1/053 165/134.1 |
| 2,063,736 A | | 12/1936 | Hardiman et al. | |
| 2,196,186 A | * | 4/1940 | Berg | F28F 1/12 165/184 |

(Continued)

FOREIGN PATENT DOCUMENTS

| | | | | |
|---|---|---|---|---|
| CA | 2504330 A1 | * | 5/2004 | F28F 1/24 |
| CN | 101691974 A | | 4/2010 | |

(Continued)

*Primary Examiner* — Jianying C Atkisson
*Assistant Examiner* — Jose O Class-Quinones
(74) *Attorney, Agent, or Firm* — Matthias Scholl P.C.; Matthias Scholl

(57) ABSTRACT

A finned heat exchanger tube, including a tube, a plurality of fins, and a plurality of outer casings. The tube includes an elongated hollow body having a wall. The plurality of fins is disposed on the wall of the tube along the longitudinal axis of the tube; the plurality of fins each includes a plurality of hollow protrusions, and corresponding hollow protrusions of the plurality of fins form a plurality of microchannels parallel to the longitudinal axis of the tube. The plurality of outer casings encircles the plurality of fins, respectively.

12 Claims, 2 Drawing Sheets

(56) References Cited

U.S. PATENT DOCUMENTS

| | | | | |
|---|---|---|---|---|
| 2,445,471 A | * | 7/1948 | Buckholdt | F28F 1/06 165/83 |
| 2,471,582 A | * | 5/1949 | Poole | F28F 1/30 165/181 |
| 2,692,763 A | * | 10/1954 | Holm | F28D 7/106 165/154 |
| 2,703,921 A | * | 3/1955 | Brown, Jr. | F28D 7/103 29/890.036 |
| 2,752,128 A | * | 6/1956 | Dedo | F28F 9/0234 165/155 |
| 3,016,893 A | * | 1/1962 | Brown, Jr. | F28D 7/10 126/116 R |
| 3,028,855 A | * | 4/1962 | Brown, Jr. | F22B 7/00 126/116 R |
| 3,036,818 A | * | 5/1962 | Legrand | F28D 7/06 165/154 |
| 3,200,848 A | * | 8/1965 | Takagi | F28F 1/105 138/38 |
| 3,288,209 A | * | 11/1966 | Wall | F28F 1/36 165/184 |
| 3,474,513 A | * | 10/1969 | Allingham | F28D 7/106 29/890.036 |
| 3,656,547 A | * | 4/1972 | Beach | F28F 1/12 165/104.19 |
| 3,795,125 A | * | 3/1974 | Laing | B21C 37/207 72/69 |
| 3,804,159 A | * | 4/1974 | Searight | F28F 1/128 165/109.1 |
| 3,878,888 A | * | 4/1975 | Seidl | F28D 20/00 165/128 |
| 3,887,004 A | * | 6/1975 | Beck | F28F 13/12 165/179 |
| 3,920,383 A | * | 11/1975 | Kerr | F28D 7/12 432/223 |
| 4,059,882 A | * | 11/1977 | Wunder | B21D 53/08 29/890.036 |
| 4,648,443 A | | 3/1987 | Szucs et al. | |
| 5,056,586 A | | 10/1991 | Bemisderfer | |
| 5,107,922 A | * | 4/1992 | So | F28F 1/105 165/109.1 |
| 5,758,720 A | | 6/1998 | Moser | |
| 2005/0056408 A1 | | 3/2005 | Gregory | |
| 2009/0196799 A1 | * | 8/2009 | Evans | F28F 7/106 422/111 |
| 2010/0091495 A1 | * | 4/2010 | Patrick | F21V 29/763 362/249.02 |
| 2010/0116466 A1 | * | 5/2010 | Hawranek | F28F 1/14 165/104.19 |
| 2010/0193168 A1 | * | 8/2010 | Johnson, Jr. | F28D 7/1669 165/164 |
| 2012/0012292 A1 | * | 1/2012 | Bugler, III | F28F 1/36 165/174 |
| 2012/0222845 A1 | * | 9/2012 | Kinder | F28F 13/12 165/154 |
| 2013/0299145 A1 | * | 11/2013 | Lee | B23P 15/26 165/165 |
| 2014/0027098 A1 | | 1/2014 | Alahyari et al. | |
| 2015/0034279 A1 | * | 2/2015 | Davidson | F25B 39/02 165/104.26 |
| 2016/0187072 A1 | * | 6/2016 | Robb | F28F 19/06 165/154 |
| 2017/0191401 A1 | * | 7/2017 | Ichiyanagi | F28D 7/10 |

FOREIGN PATENT DOCUMENTS

| | | | | |
|---|---|---|---|---|
| CN | 105043151 A | | 11/2015 | |
| CN | 105758245 A | | 7/2016 | |
| CN | 107976101 A | | 5/2018 | |
| CN | 207832003 U | | 9/2018 | |
| CN | 109059601 A | | 12/2018 | |
| DE | 2415656 A1 | | 10/1975 | |
| EP | 1314938 A4 | * | 5/2004 | F28F 1/105 |
| GB | 636910 A | * | 5/1950 | F28F 1/105 |
| GB | 1141514 A | * | 1/1969 | B21D 53/08 |
| GB | 1527875 A | * | 10/1978 | F28F 1/105 |
| WO | 2006055916 A2 | | 5/2006 | |
| WO | WO-2012169915 A1 | * | 12/2012 | F28F 1/105 |
| WO | 2014050418 A1 | | 4/2014 | |

* cited by examiner

FINNED HEAT EXCHANGER TUBE

CROSS-REFERENCE TO RELATED APPLICATIONS

This application is a continuation-in-part of International Patent Application No. PCT/CN2018/122564 with an international filing date of Dec. 21, 2018, designating the United States, now pending, and further claims foreign priority benefits to Chinese Patent Application No. 201711410324.2 filed on Dec. 22, 2017. The contents of all of the aforementioned applications, including any intervening amendments thereto, are incorporated herein by reference.

BACKGROUND

The disclosure relates to a finned heat exchanger tube.

Conventional heat exchanger tubes include a plurality of heat dissipation fins disposed on the wall of the tube. Hot liquid flows in the hollow body of the tube, and cold liquid flows in the heat dissipation fins to achieve heat exchange. The heat dissipation fins are an integrated structure surrounding the tube, so the flow direction of the hot liquid is perpendicular to that of the cold liquid. The cross-flow heat exchange exhibits a relatively low heat transfer efficiency.

SUMMARY

The disclosure provides a finned heat exchanger tube, comprising a tube, a plurality of fins, and a plurality of outer casings. The tube comprises an elongated hollow body having a wall. The plurality of fins is disposed on the wall of the tube along the longitudinal axis of the tube; the plurality of fins each comprises a plurality of hollow protrusions, and corresponding hollow protrusions of the plurality of fins form a plurality of microchannels parallel to the longitudinal axis of the tube. The plurality of outer casings encircles the plurality of fins, respectively.

The distance between every two adjacent fins is less than 5 mm.

The tube is a metal tube having a circular section or a special pipe.

An inner fin, a spring bar, a spiral piece, or a combination thereof is disposed in the elongated hollow body of the tube.

The plurality of fins each is a metal sheet or a metal strip circumferentially disposed on the wall of the tube and is symmetrical with respect to the longitudinal axis of the tube.

The plurality of outer casings each is a metal sheet or a metal strip surrounding the plurality of fins, respectively.

The plurality of outer casings each is a symmetrical structure with respect to the longitudinal axis of the tube.

The tube comprises a first fluid inlet and a first fluid outlet disposed on two ends of the tube, respectively; the plurality of microchannels formed by the plurality of fins each comprises a second fluid inlet and a second fluid outlet; the first fluid inlet and the second fluid outlet are on one end of the tube, and the first fluid outlet and the second fluid inlet are on another end of the tube.

The total surface area of the plurality of fins is larger than that of the tube.

The plurality of outer casings each is integrated with a corresponding fin.

The metal sheet or metal strip of the plurality of fins has a width of 3-20 mm and a thickness of 0.5-1.5 mm.

The metal sheet or metal strip of the plurality of outer casings has a width of 3-20 mm and a thickness of 0.2-1 mm.

Advantages of the finned heat exchanger tube according to one embodiment of the disclosure are summarized as follows: the flows of the fluids in and out of the tube are in two opposite directions, thus improving the heat exchange efficiency. The plurality of fins disposed on the wall of the pipe forms a plurality of microchannels, and also plays the role of a spoiler, thus prolonging the heat exchange time, and improving the heat transfer rate.

Figure 1:
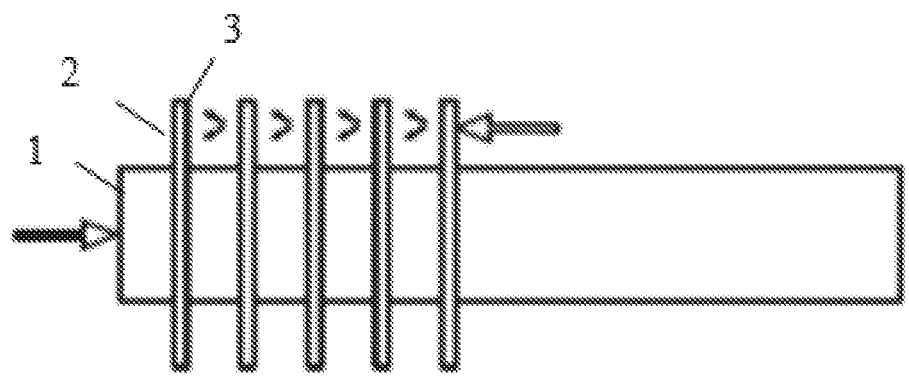
FIG. 1 is a front view of a finned heat exchanger tube according to one embodiment of the disclosure.

In the drawings, the following reference numbers are used: 1. Tube; 2. Fin; and 3. Outer casing.

DETAILED DESCRIPTION

To further illustrate, embodiments detailing a finned heat exchanger tube are described below. It should be noted that the following embodiments are intended to describe and not to limit the disclosure.

Example 1

As shown in FIG. 1, the finned heat exchanger tube comprises a tube 1, a plurality of fins 2, and a plurality of outer casings 3 encircling the plurality of fins 2, respectively. The plurality of outer casings each is a frame structure for connection.

The tube 1 comprises an elongated hollow body having a wall; a first fluid flows in the hollow body of the tube; further, an inner fin, a spring bar, a spiral piece, or a combination thereof is disposed in the elongated hollow body of the tube to function as a spoiler of the first fluid, to achieve the turbulence effect and improve the heat transfer efficiency.

The plurality of fins 2 is disposed on the wall of the tube along a longitudinal axis of the tube; the plurality of fins each comprising a plurality of hollow protrusions, and corresponding hollow protrusions of the plurality of fins forming a plurality of microchannels parallel to the longitudinal axis of the tube, where a second fluid flows along the microchannels.

Each of the plurality of outer casings 3 is disposed outside a corresponding fin. The outer casings can reduce the cross flow of the second fluid with respect to the tube, so that the flow direction of the second fluid is as possibly opposite to that of the first fluid in the tube, thus improving the heat transfer rate of the finned heat exchanger tube.

The tube 1 comprises a first fluid inlet and a first fluid outlet disposed on two ends of the tube, respectively; the plurality of microchannels formed by the plurality of fins each comprises a second fluid inlet and a second fluid outlet; the first fluid inlet and the second fluid outlet are on one end of the tube, and the first fluid outlet and the second fluid inlet are on the other end of the tube. In the working state, the first fluid and the second fluid flow in two opposite directions, thus improving the heat exchange efficiency.

Specifically, the plurality of fins 2 is disposed on the wall of the tube 1 along the longitudinal axis of the tube. The plurality of fins 2 is integrated with the tube 1 by welding or rolling process. The total surface area of the plurality of fins 2 is larger than that of the tube 1, thereby improving the heat transfer rate.

The hollow protrusions of the plurality of fins form a plurality of microchannels parallel to the axis of the tube, and the second fluid flows along the microchannels. The plurality of hollow protrusions is formed by laser cutting or punching, the shape thereof includes but is not limited to slit, radial, etc.

The plurality of fins 2 each is wrapped by the corresponding outer casing 3 or is integrated with the outer casing 3.

Figure 2:
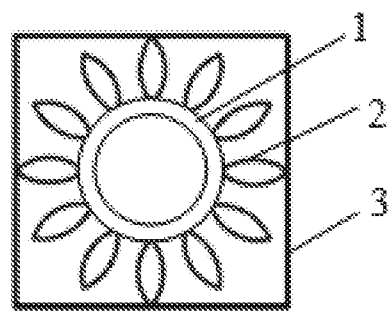
FIG. 2 is a side view of a finned heat exchanger tube according to one embodiment of the disclosure.

As shown in FIG. 2, the plurality of fins 2 each is a metal sheet or a metal strip comprising a plurality of oval-shaped hollow protrusions or oval-like-shaped hollow protrusions. The plurality of fins 2 is disposed on the wall of the tube 1 along the axis of the tube. The outer surface of the plurality of fins is perpendicular to the axis of the tube 1. The cross-section of the plurality of fins 2 a petal-like symmetrical structure with respect to the axis of the tube 1.

The working method of the finned heat exchanger tube is as follows:

The tube, the plurality of fins 2, and the plurality of outer casing 3 cooperate with each other to constitute a finned heat exchanger tube and are disposed in a heat exchanger. When a compact heat exchanger is required, the finned heat exchanger tube comprising the tube 1, the plurality of fins 2 and the outer casings 3 can be directly manufactured by additive manufacturing (3D printing) technology.

The first fluid enters the elongated hollow body of the tube 1 from the first fluid inlet (for example, the chamber inlet of the shell and tube heat exchanger), flows along the inner surface of the tube 1 to the first fluid outlet of the tube 1. The first fluid flowing in the tube 1 exchanges heat with the inner surface of the tube 1. The second fluid enters the second fluid inlet of the heat exchanger (for example, the shell inlet of the shell and tube heat exchanger), flows along the outer surface of the tube 1 to the second fluid outlet of the heat exchanger. The first fluid and the second fluid flow in two opposite directions. The second fluid flows along the microchannels of the plurality of fins 2 that expands the outer surface area of the tube 1 and stirs the second fluid, restricting the second fluid to flow reversely through the microchannels along the axis of the finned heat exchanger tube. The second fluid flowing outside the tube 1 exchanges heat with the outer surface of the tube 1, the plurality of fins 2, and the outer casings 3. Thus, the heat conduction occurs between the finned heat exchanger tube 1, the plurality of fins 2, and the outer casings 3.

Example 2

Figure 3:
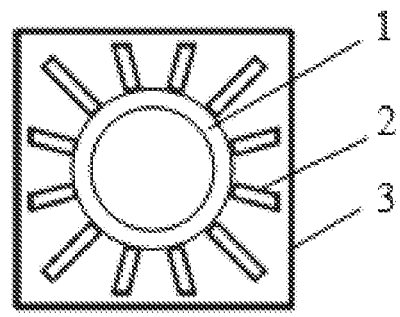
FIG. 3 is a side view of a finned heat exchanger tube according to another embodiment of the disclosure.

As shown in FIG. 3, the finned heat exchanger tube is basically the same as that in Example 1 except that the plurality of fins 2 each comprises a plurality of hollow rectangular frames formed by a metal sheet or a metal strip. The plurality of fins 2 is circumferentially disposed on the wall of the tube. The cross section the each of the plurality of fins 2 is perpendicular to the axis of the tube, and each fin is symmetrical with respect to the longitudinal axis of the tube.

Example 3

Figure 4:
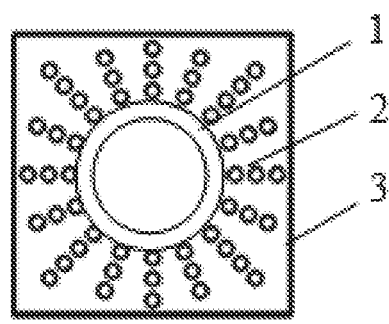
FIG. 4 is a side view of a finned heat exchanger tube according to still another embodiment of the disclosure.

As shown in FIG. 4, the finned heat exchanger tube is basically the same as that in Example 1 except that the plurality of fins 2 each comprises a string of hollow balls formed by a metal sheet or a metal strip. The plurality of fins 2 is circumferentially disposed on the wall of the tube. The cross section the each of the plurality of fins 2 is perpendicular to the axis of the tube, and each fin is symmetrical with respect to the longitudinal axis of the tube.

It will be obvious to those skilled in the art that changes and modifications may be made, and therefore, the aim in the appended claims is to cover all such changes and modifications.

What is claimed is:

1. A device, comprising:
   1) a tube, the tube comprising an elongated hollow body having a wall;
   2) a plurality of fins, the plurality of fins being disposed on the wall of the tube along a longitudinal axis of the tube; the plurality of fins each comprising a plurality of hollow protrusions, and corresponding hollow protrusions of the plurality of fins forming a plurality of microchannels parallel to the longitudinal axis of the tube; and
   3) a plurality of outer casings serially disposed along the longitudinal axis of the tube, the plurality of outer casings individually encircling a corresponding one of the plurality of fins.

2. The device of claim 1, wherein the tube is a metal tube having a circular section.

3. The device of claim 1, wherein an inner fin, a spring bar, a spiral piece, or a combination thereof is disposed in the elongated hollow body of the tube.

4. The device of claim 1, wherein the plurality of fins each is a metal sheet or a metal strip circumferentially disposed on the wall of the tube and is symmetrical with respect to the longitudinal axis of the tube.

5. The device of claim 1, wherein a distance between every two adjacent fins is less than 5 mm.

6. The device of claim 4, wherein a distance between every two adjacent fins is less than 5 mm.

7. The device of claim 4, wherein the metal sheet or metal strip has a width of 3-20 mm and a thickness of 0.2-1 mm.

8. The device of claim 1, wherein the plurality of outer casings each is a metal sheet or a metal strip.

9. The device of claim 1, wherein the plurality of outer casings each is a symmetrical structure with respect to the longitudinal axis of the tube.

10. The device of claim 1, wherein the tube comprises a first fluid inlet and a first fluid outlet disposed on two ends of the tube, respectively; the plurality of microchannels formed by the plurality of fins each comprises a second fluid inlet and a second fluid outlet; the first fluid inlet and the second fluid outlet are on one end of the tube, and the first fluid outlet and the second fluid inlet are on another end of the tube.

11. The device of claim 1, wherein a total surface area of the plurality of fins is larger than that of the tube.

12. The device of claim 1, wherein the plurality of outer casings each is integrated with a corresponding fin.

\* \* \* \* \*